Inventor:
Walter

Dec. 29, 1970  W. KAULE  3,550,435
PROCESS AND APPARATUS FOR THE ULTRASONIC
INSPECTION OF MATERIALS
Filed Aug. 2, 1967  5 Sheets-Sheet 3

Inventor:

United States Patent Office 3,550,435
Patented Dec. 29, 1970

3,550,435
PROCESS AND APPARATUS FOR THE ULTRA-
SONIC INSPECTION OF MATERIALS
Walter Kaule, Thurnerstr. 111, Cologne-Deutz, Germany
Filed Aug. 2, 1967, Ser. No. 657,933
Claims priority, application Germany, Aug. 6, 1966,
1,573,627; Dec. 23, 1966, 1,573,596
Int. Cl. G01b 17/00; G01n 29/04
U.S. Cl. 73—67.8
12 Claims

ABSTRACT OF THE DISCLOSURE

Method and apparatus are disclosed for non-destructive ultrasonic testing of test objects. A pulse of ultrasonic energy is applied to a test object. An electrically conductive or a magnetoelastic structure is provided at the surface of the test object to which the ultrasonic energy is applied to pick up a time varying magnetic field adjacent to the surface of the test object. A pickup coil structure is coupled to the time varying magnetic field produced by the pulse of ultrasonic energy to induce an electrical potential signal in the coil representative of the time the pulse of ultrasonic energy entered the test object. This electrical signal is used as a time mark for ultrasonic transit time measurements, i.e., thickness and flaw detection and may especially also be used for automatic control of the coupling of ultrasonic energy into the test object.

DESCRIPTION OF THE PRIOR ART

Heretofore, various methods for controlling the coupling of ultrasonic energy into the test object have been proposed. Such prior art methods are described in a text titled, "Werkstoffprufung mit Ultraschall," by J. and H. Krautkramer, Springer, Berlin (1961), and briefly include:

(a) Vertical irradiation with observation of the height of back echo.

(b) Angle scanning in conjunction with the use of a second, vertical search unit and observation of the sequence of multiple echoes received from the back face.

(c) Angle scanning in combination with an additional control transducer, which measures the amplitude of sonic energy reflected at the plastic wedge-specimen interface and (d) Angle scanning, of tubular products for example, whereby a control echo is produced by an oppositely positioned, second transducer, pp. 351 and 371.

These methods have the following disadvantages:

(a) When a defect is disposed at an angle to the sound beam, said defect is disposed at an angle to the transmitted by the probe and, thus, the reference signal employed for coupling control will not be received. It is then not possible to control the coupling.

(b) The multiple-echo pattern generated by the vertical search unit covers a large portion of the scanning range of interest. Thus, as a rule, the coupling can be controlled only intermittently.

(c) The measured amplitude is in a very complicated manner dependent on the emergent amplitude.

(d) Large discontinuities in the dead zone of the probe (disturbance echo zone) cause the control echo to disappear, but they themselves are not detectable, because the signals fall within the disturbance echo zone.

None of the methods (a) to (d) permits the determination of the time at which the sonic pulse enters the specimen.

In physics, the magnetoelastic effect is well known. According to it in ferromagnetic material the magnetizing constant (permeability) will change when the mechanical tension changes. A change of tension and change of permeability may be originated by sonic waves which create material contractions and relatively void material spaces in intermittent sequence in the test object. As known per se, in order to receive sonic waves on the ferromagnetic material, a coil is arranged adjacent the member and is supplied with direct current which provides a pre-magnetization in the material. Change of permeability, originating from sonic waves, is coupled with a change of magnetic induction. The corresponding output can be obtained by inductive coupling, amplification and subsequent display on a screen. Corresponding principles are applicable when employing magnetostrictive material. This will occur in the skin of the material in view of the high frequencies. Electric and magnetic fields will be produced on the surface of an electric conductor (skin effect). The depth of these fields depends upon the frequency and will be a few millimeters in a ferromagnetic specimen for 1 megahertz excitation. This is explained in a publication of the Krautkramer Company "The Echo," No. 13, pages 10–17, January 1965.

Means of generating electro-inductive sonic and ultrasonic waves, on the principle of the moving-coil loudspeaker, for example, are known to the art. In ultrasonic transmission operation, an alternating magnetic field produced on the surface of an electrical conductor generates electrical eddy currents in said conductor. As a result thereof, varying mechanical forces, which may generate sonic waves, are induced between the coil, employed for producing the magnetic field, and the specimen. A suitably arranged steady magnetic field intensifies the effect and ensures that the sonic frequency generated will be equal to the exciting frequency, and not double said exciting frequency, which obtains by the aforementioned arrangement.

The effect of such a device as an ultrasonic receiver can be stated as follows: If when impinging upon the surface of the electrically conductive specimen, the steady magnetic field is transversely disposed to the direction of particle movement of the sound wave, which in effect, through the local increases and decreases in density of the medium, is the cause of vibration in the material of the specimen, an electric alternating voltage will be induced in a third dimension at right angles to the two directions. This will induce an electric and magnetic eddy current field near said surface.

Furthermore, U.S. Pat. 3,048,031 discloses a circuit arrangement, which with the aid of the back echo controls the gain of a conventional pulse-echo instrument, in the manner of an automatic volume control of a radio receiver, to correct variations in sensitivity caused by changes in probe-to-specimen contact. But the back echo is unsuitable as a reference signal, as imperfections in the specimen will result in loss of energy.

SUMMARY OF THE INVENTION

The object of the invention is to provide an improved process and apparatus for non-destructive ultrasonic testing of materials.

It is proposed that a pulse of electrical voltage induced in the surrounding medium by the irradiation of the surface area, be received and/or indicated by a monitoring receiver which may take the form of a coil. When ultrasound enters the workpiece, that is to say, when the probe and workpiece are acoustically coupled, an electric potential will be induced in the monitoring receiver, either as a result of the magnetoelastic (magnetostrictive) or of the magnetoinductive effect, as more fully described below with regard to FIGS. 13 and 14. The amplitude of said pulse of electrical voltage is proportional to the amplitude of the sound entering said workpiece and, thus, a measure of the quality of the coupling. As both magneto-effects are propagated practically free from delay, the monitoring pulse originates in the receiver coil simultaneously with the penetration of the specimen by the ultrasonic pulse. Suitable premagnetization of the workpiece increases the sensitivity of the indication. The monitoring pulse can be displayed according to amplitude and time, on the cathode-ray tube screen of an ultrasonic flaw detector and also on a second screen, of an oscilloscope. In the case of the effect of magnetic induction, use is made of the surface of the test object, which must be at least partially electrically conductive. In this connection it is important that a frontal member of a non-conducting material be fitted to the probe.

A further version of the invention provides for a layer of conducting material to be applied to the test object, whch may be at the contact surface, for example.

Examples of the invention are hereinafter described in conjunction with the drawings.

DESCRIPTION OF THE PREFERRED EMBODIMENTS

Figure 1:
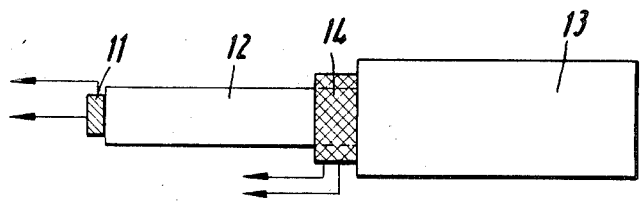
FIG. 1 shows a simplified testing arrangement.

Referring now to FIG. 1, an ultrasonic transducer 11, such as a piezoelectric transducer, of any desired type, is in contact with a sound-conducting delay column 12 of one or more solid materials or fluids. The transducer 11 beams ultrasonic pulses through the delay column 12 into, in this case, the flaw-free test object 13, to detect by the pulse-echo method discontinuities therein or, from the transit-time, to measure the wall thickness. To do this, the delay column 12 and the test object 13 must be acoustically coupled, that is to say, generally in contact through a solid or liquid substance. Sonic transmission through a layer of air is unserviceable on account of the extremely small permeability, and according to the invention is distinct from good acoustical contact. When there is good contact, the sonic pulses enter the test object with considerable amplitude. A magneto-receiver 14 which can be a coil wound with wire is connected to an amplifier and display equipment shown in the diagram of FIG. 14.

Figure 17:
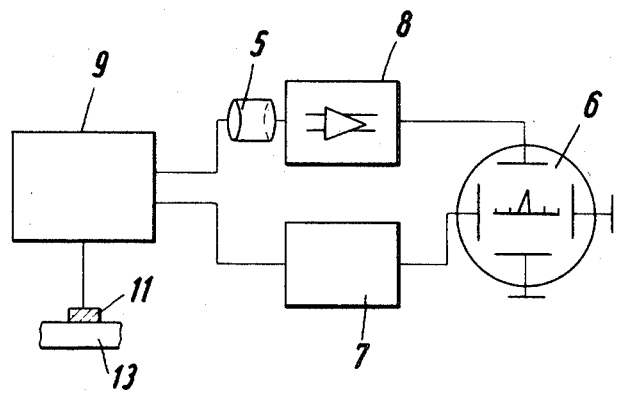
FIG. 17 is a general block wiring diagram of the ultrasonic flaw detector.
Figure 18:
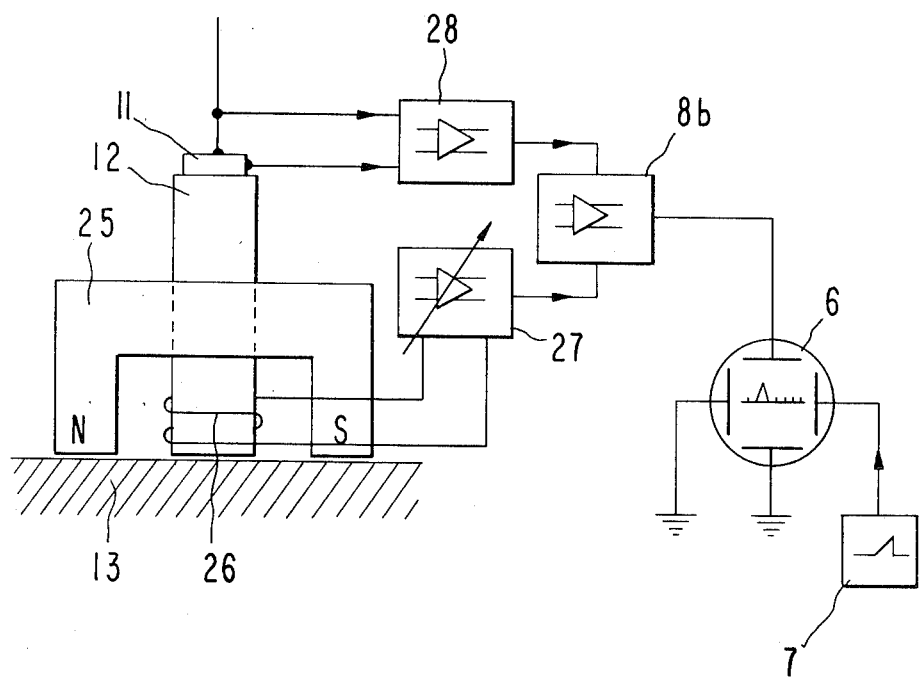
FIG. 18 is a block diagram depicting the wiring of an ultrasonic flaw detector showing the combined display of signals received by the sonic transmitter transducer and the inductive pickup coil and incorporating features of the present invention.

The general block wiring diagram of an ultrasonic pulse generator 9 with amplifier 8, sweep generator 7 and cathode-ray tube 6 is illustrated in FIG. 17. In individual instances, a delay line 5 can be added.

Figure 2:
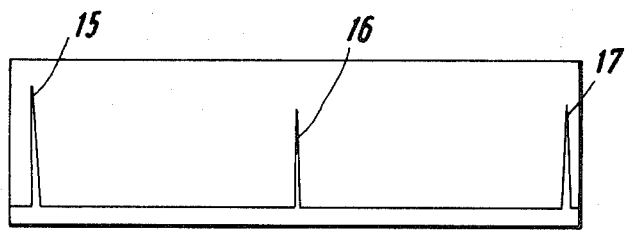
FIG. 2 shows the screen display with the surface echo.

FIG. 2 shows the display of a prior art fluorescent screen of an ultrasonic flaw detector, with the transmitter pulse 15, the echo 16 from the end surface of the delay column 12 and the echo 17 from the back face of the workpiece.

Figure 3:
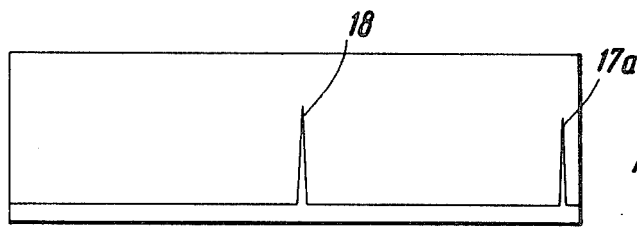
FIG. 3 shows a separate representation of the trace on the screen of a second cathode-ray tube.

FIG. 3 shows a coupling control display as derived from receiver 14 and displayed on, for example, the fluorescent screen of a second cathode-ray tube, with the monitoring echo 18 and the back face echo 17a, with the same transit-time scale.

Figure 4:
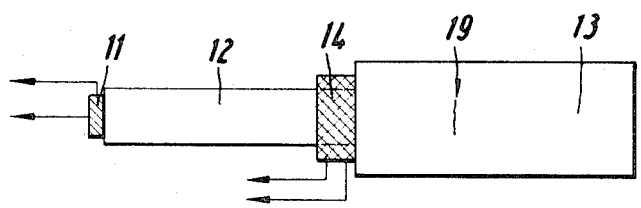
FIGS. 4 to 6 and 7 to 9 and 10 to 12 are groups of arrangements similar to FIGS. 1 to 3.

FIG. 4 shows the same arrangement with a defect 19 in the test object 13.

Figure 5:
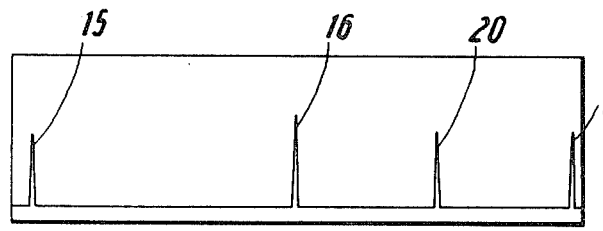

The ultrasonic trace patern shown in FIG. 5 includes the known defect echo 20.

Figure 6:
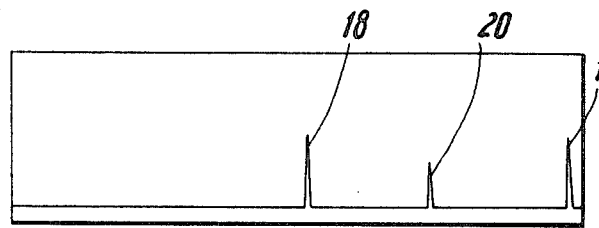

FIG. 6 shows the magneto-derived defect echo 20, back face echo 17a in addition to the monitoring 18.

Figure 7:
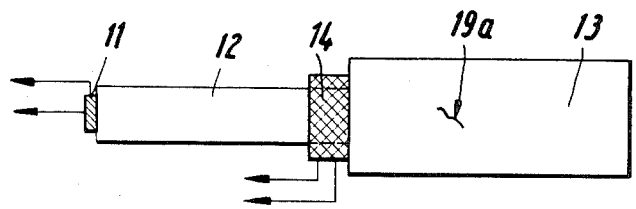

FIG. 7 shows the same arrangement as in FIG. 4, but with a flaw 19a orientated at an angle to the surface.

Figure 8:
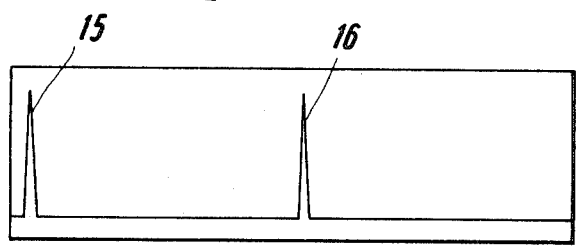
Figure 9:
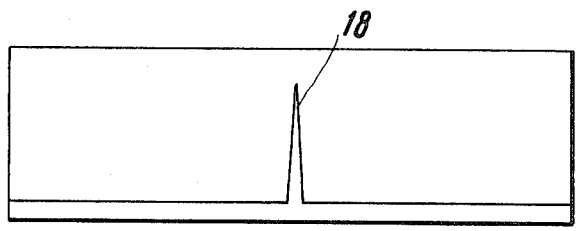

Neither a sonic defect echo nor a back face echo is shown in FIG. 8. But there is probe-to-specimen contact, because the magneto-monitoring echo 18 is displayed in the trace pattern illustrated in FIG. 9.

Figure 10:
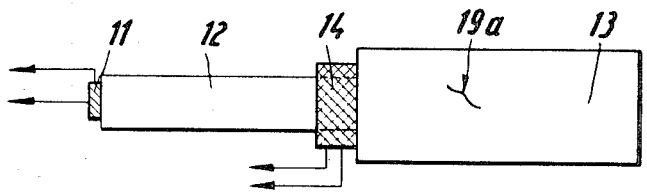

FIG. 10 shows the same arrangement as FIG. 7, but the probe and test object are not acoustically coupled.

Figure 11:
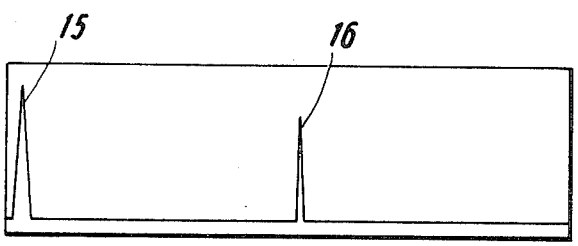
Figure 12:
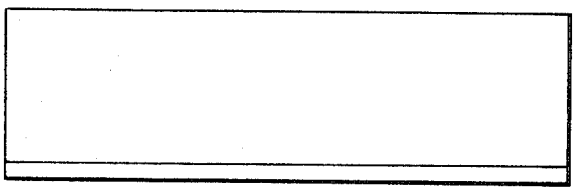

FIG. 11 shows the same display depicted in FIG. 8. But in FIG. 12 the absence of the magneto-monitoring echo denotes that the probe and test object are not coupled.

Therefore, in the above example the magneto-receiver 14 affords positive proof of acoustical coupling, even should the unfavourable orientation of a defect prevent the reception of the back echo.

For the digital thickness measurement of thin walls, for instance, it may be advantageous to move ahead, in respect of transit time, the magneto-monitoring echo as starting mark, so as to distinguish it clearly from the back echo, if the first surface echo 16 shown in FIG. 2 has already been suppressed by the use of a double-transducer probe. This can be effected in a known manner by delaying through a delay line 5, FIG. 17, for example, all piezoelectric echo indications in the amplifier of a conventional ultrasonic flaw detector. Such a system is described in the aforecited text at page 105. If in such an arrangement the back echo 17 indicated by the monitoring receiver 14, as shown in FIG. 3, has a disturbing effect, an electrical circuit for the suppression of all indications following the monitoring echo during a specific period of time can be incorporated in a known manner in the amplification branch for the monitoring receiver.

Figure 13:
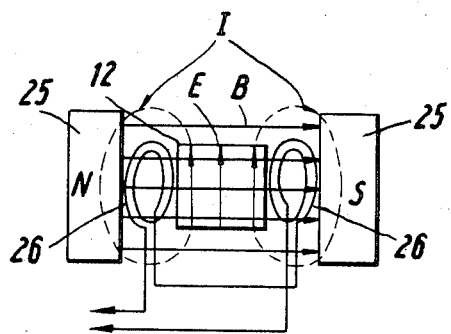
FIG. 13 is a general representation of the receiver device, especially for the magnetic induction effect, viewed in the axial direction to the delay column.
Figure 14:
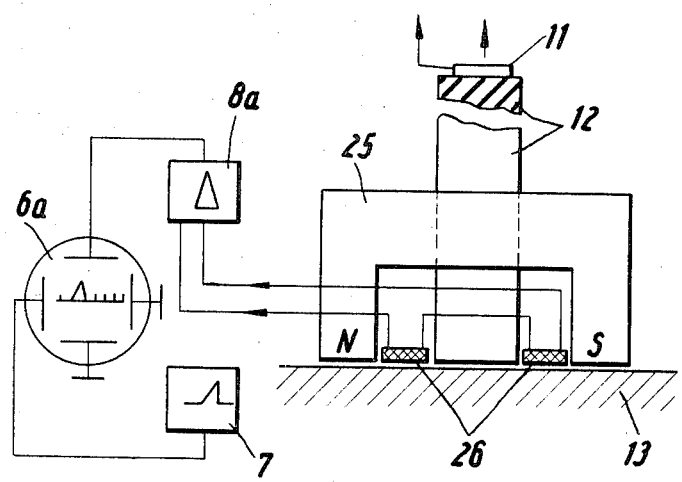
FIG. 14 is a side view of the general representation FIG. 13, together with its block wiring diagram.

In FIGS. 13 and 14, there is shown schematically an example of a magnetic induction receiver device 14 together with the magnetic and electrical fields in the surface of the test object. The signal of the receiver device 14, like the echoes of a conventional ultrasonic flaw detector can, by means of amplifier 8a and sweep generator 7, be displayed on the time base of an oscilloscope screen 6a, as well as on the screen 6 of the ultrasonic flaw detector of FIG. 17. For the purpose of common display of signals from probe 11 and coil 26, upon one single screen 6, they will either be separated and amplified in preamplifiers 27 and 28 or supplied directly into mixer stage amplifier 8b, the output of which is fed to vertical deflection plates of screen tube 6. For the purpose of comparison, applying common display, the amplitude of control signals received by coil 26 should be vertically adjusted on the screen 6. In order to obtain vertical adjustment, a preamplifier 27 of variable gain is provided. By means known per se, said signal can also be employed to operate, through gate amplifiers, flaw warning devices and recording apparatus, maintain constant the sensitivity of flaw detection, control the transmission energy or the gain of the ultrasonic flaw detector.

The delay column 12 is assumed to be of rectangular cross-section. N is the north-seeking and S is the south-seeking pole of a magnetic system 25, which induces a steady magnetic field B in the surface of the test object. Assuming that a train of longitudinal waves has just entered the surface, which will mean that the particle movement is at right angles to the plane of drawing FIG. 13, alternating voltages E will result from said particle movement and set up eddy-current system I. As a consequence thereof, an alternating voltage will be induced in coils 26, which will follow exactly the shape of the sonic wave pulse.

Figure 15:
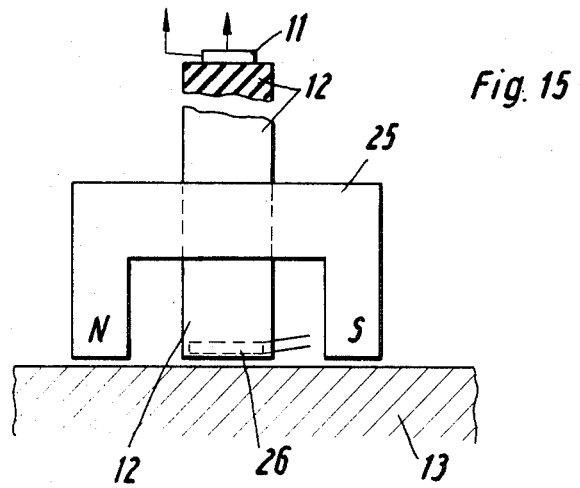
FIG. 15 is a representation corresponding to FIG. 14 (excluding the block wiring diagram) with a coil incorporated in the delay column.
Figure 16:
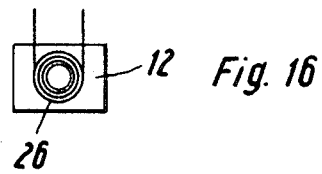
FIG. 16 is a simplified plan view of the under side of the coil of FIG. 15.

Referring now to FIGS. 15 and 16, the design is not limited to the afore-described arrangement. The shape and position of the coils 26 and of the magnetic system can be varied, in particular to suit the type of ultrasonic waves to be detected.

For instance, transverse or shear waves propagated at right angles to the surface can be detected by producing a magnetic field at right angles to the surface, at the point at which the beam enters, by a coil 26 in concentric arrangement with the delay column 12, with a magnetizing direct-current flowing in the coil 26. In a manner known per se, the receiver coils 26 in FIG. 13 can also be arranged in circuit so that they simultaneously induce the steady magnetic field and receive the varying field. For example, when direct current is supplied to pickup coil 26, such coil will act as an electromagnet. Sonic waves penetrating this specimen will induce in coil 26 an alternating potential. This potential will be superimposed on the direct potential and the output of this alternating potential can be extracted in a manner known per se, i.e., by using coupling capacitors. The coils can also be incorporated in the non-conducting delay column so that they are penetrated by the ultrasonic waves.

The magneto-receiver device 14 can be an independent unit, designed for use with various combinations of a sonic transmitter and receiver 11 and a delay column 12. But it can also be incorporated in a probe unit, complete with connecting cables, for example.

The method disclosed by the invention can be employed to measure a transit time, such as the transit time of an ultrasonic pulse, from the surface to a discontinuity or the bottom face and back. The magneto-monitoring signal provides a pulse for determining with great accuracy the start of the transit-time measurement, and is unaffected by the coupling layer between the probe with delay column and the test object. The terminal pulse, that is to say a defect or a back echo, can be received by the same magneto-receiver equipment 14; see FIG. 3. The time interval between the there depicted pulses 18 and 17a is double the transit time. This application of the magneto-monitoring pulse has a further advantage, in that in most instances when wall thickness is measured, its amplitude will be of the same order of magnitude as that of the back echo, in contradistinction to prior art methods with conventional probes and measurement in contact or through a delay column, whereby the reference pulse for the start is the transmitter pulse or the echo reflected by the surface of the test object, both of which being of considerably greater amplitude than the back echo. Because the non-suitable dead zone behind these echoes is proportional to their amplitudes, the thickness of much thinner walls can be measured with the magneto-monitoring signal received by the electromagnetic induction or magnetoelastic means rather than by prior art methods.

In the same manner, the invention provides for coupling control by the transmission method and in general by using separate transmitter and receiver probes. In such instances the magneto-monitoring receiver 14 is incorporated in the same probe as the transmitter transducer. In order to determine exactly the transit time of sonic pulses in the specimen it is essential to fix the point of time at which the sonic pulse penetrates the surface of the specimen. The invention can also be employed to obtain a magneto-monitoring echo from the surface of the test object, irrespective of the distance thereof from the probe, and to use said control echo as the starting point for a monitor gate, for example, in particular for measuring the wall thickness of hot components, where the transmit time in the delay column may continually vary as a result of the elevated temperature.

What is claimed is:

1. In a method of ultrasonic non-destructive testing of materials for detection of the coupling between a sonic transducer unit and the test piece the steps of, acoustically coupling a sonic transducer to an electrically conductive or magnetoelastic surface of a test object, penetrating the surface of the test object with a magnetic field, applying a pulse of ultrasonic energy to the surface of the test object for penetration into the surface and for entering the test object and for establishing a time varying magnetic field due to the sonic vibration of the magnetoelastic or conductive surface portion of the test object, detecting the sonically produced time varying magnetic field by induction of the pulse of electrical potential in an electrical circuit coupled to the surface of the test object in the vicinity of the point of sonic coupling to the test object, such detected pulse of electrical potential being indicative of the degree of sonic coupling to the test object.

2. The method of claim 1 including the step of employing the induced pulse of electrical potential as a time mark for the measurement of ultrasonic transit time in the test object.

3. The method of claim 2 including the steps of delaying a transit time signal representative of an echo of the pulse of ultrasonic energy applied to the test object, displaying the delayed echo signal, and displaying the induced electric potential signal without such delay.

4. The method of claim 1 including the step of separately controlling the intensity of the induced electrical potential signal, and visibly displaying the induced signal together with subsequent ultrasonic echo signals derived from the test object on a fluorescent screen in accordance with the relative transit times.

5. In an apparatus for ultrasonic non-destructive testing of materials, sonic transducer means for generating and for applying a pulse of ultrasonic energy to an electrically conductive or magnetoelastic surface of a test object to be tested and penetrated by a magnetic field to produce a time varying magnetic field in the vicinity of the surface of the test object to which the ultrasonic energy is applied in response to the applied pulse of ultrasonic energy, and means forming an electrical circuit coupled to the produced time varying magnetic field in the vicinity of the surface to which the ultrasonic energy is applied for inducing a time varying electrical potential signal in said circuit indicative of the sonic coupling to the test object.

6. The apparatus of claim 5 wherein said means for applying the pulse of ultrasonic energy to the test object includes means forming an ultrasonic delay column made of an electrically non-conductive solid material.

7. The apparatus of claim 5 wherein said electrical circuit means in which the electrical potential is induced includes at least one electrical coil disposed in the vicinity of the area of test object to which the ultrasonic energy is applied.

8. The apparatus of claim 5 including means forming a magnet structure for producing a magnetic field in the test object which is relatively static compared to the applied ultrasonic energy.

9. The apparatus of claim 8 wherein said magnetic structure is an electro-magnet including a coil structure in common with said electrical circuit means in which the electrical potential is induced.

10. The apparatus of claim 6 wherein said electrical circuit in which said electrical potential signal is induced includes at least one coil which is disposed within said delay column.

11. The apparatus of claim 6 wherein said electrical circuit in which said electrical potential signal is induced includes at least one coil which has an axis substantially parallel to the longitudinal axis of said delay column.

12. The apparatus of claim 5 wherein said means for applying the pulse of ultrasonic energy and said electrical circuit means in which the electrical potential signal is induced are affixed together as a unitary probe structure.

(References on following page)

References Cited

UNITED STATES PATENTS

| | | | |
|---|---|---|---|
| 2,656,714 | 10/1953 | Cartier | 73—67.8 |
| 3,048,031 | 8/1962 | Beaujard et al. | 73—67.8 |

FOREIGN PATENTS

| | | | |
|---|---|---|---|
| 1,132,620 | 11/1956 | France | 73—67.7 |

RICHARD C. QUEISSER, Primary Examiner

J. P. BEAUCHAMP, Jr., Assistant Examiner

U.S. Cl. X.R.

73—67.9